(12) United States Patent
Chae et al.

(10) Patent No.: US 8,767,297 B2
(45) Date of Patent: Jul. 1, 2014

(54) OPTICAL FILM AND METHOD OF ADJUSTING WAVELENGTH DISPERSION CHARACTERISTICS OF THE SAME

(75) Inventors: Seung Hun Chae, Daejeon (KR); Belyaev Sergey, Daejeon (KR); Byoung Kun Jeon, Daejeon (KR); Moon Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/448,880

(22) PCT Filed: Aug. 13, 2008

(86) PCT No.: PCT/KR2008/004715
§ 371 (c)(1),
(2), (4) Date: Jul. 13, 2009

(87) PCT Pub. No.: WO2009/022863
PCT Pub. Date: Feb. 19, 2009

(65) Prior Publication Data
US 2010/0134910 A1  Jun. 3, 2010

(30) Foreign Application Priority Data
Aug. 14, 2007  (KR) .................. 10-2007-0081943
Aug. 13, 2008  (KR) .................. 10-2008-0079275

(51) Int. Cl.
*G02B 5/30*  (2006.01)
(52) U.S. Cl.
USPC .................. 359/489.07; 359/489.01
(58) Field of Classification Search
None
See application file for complete search history.

(56) References Cited

U.S. PATENT DOCUMENTS

| | | | |
|---|---|---|---|
| 3,799,653 A | 3/1974 | Ikeda | |
| 4,446,305 A * | 5/1984 | Rogers et al. ................. | 528/348 |
| 5,189,538 A | 2/1993 | Arakawa | |
| 5,396,355 A | 3/1995 | Wada et al. | |
| 6,361,838 B1 | 3/2002 | Miyatake et al. | |
| 6,411,344 B2 | 6/2002 | Fujii et al. | |
| 6,800,687 B2 | 10/2004 | Kawahara et al. | |
| 1,264,568 A1 | 6/2005 | Ito | |
| 7,269,307 B2 * | 9/2007 | Jen ................................. | 385/11 |
| 2004/0080693 A1 | 4/2004 | Kuzuhara et al. | |
| 2005/0014913 A1 | 1/2005 | Kim et al. | |
| 2006/0147724 A1 | 7/2006 | Mizuno | |
| 2006/0188664 A1 | 8/2006 | Ando et al. | |
| 2009/0096959 A1 * | 4/2009 | Jeon et al. ....................... | 349/76 |

FOREIGN PATENT DOCUMENTS

| | | |
|---|---|---|
| DE | 100 33 916 A1 | 3/2001 |
| EP | 1 103 885 A1 | 5/2001 |
| EP | 1930750 A1 | 6/2008 |
| GB | 2 355 315 B | 10/2003 |
| JP | 2609139 | 5/1990 |
| JP | 2-256023 | 10/1990 |

(Continued)

*Primary Examiner* — Arnel C Lavarias
(74) *Attorney, Agent, or Firm* — McKenna Long & Aldridge LLP

(57) ABSTRACT

An optical film includes at the least one retardation film and at least one isotropic layer made of an isotropic material, wherein the difference in average refractive index between the retardation film and the isotropic layer is at least 0.1 or more. Also, the method of adjusting wavelength dispersion characteristics of an optical film includes: stacking an isotropic layer onto a retardation film. A method for preparing optical film having a variety of wavelength dispersion characteristics by the simple method of coating the retardation film with the isotropic layer.

1 Claim, 16 Drawing Sheets

(56) References Cited

FOREIGN PATENT DOCUMENTS

| | | |
|---|---|---|
| JP | 05-196816 A | 8/1993 |
| JP | 1995-098411 | 4/1995 |
| JP | 2003-098348 A | 4/2003 |
| JP | 2004-287109 A | 10/2004 |
| JP | 2006-154837 | 6/2006 |
| JP | 2007-133172 | 5/2007 |
| TW | I264568 B | 10/2006 |
| WO | WO 9517691 A1 * | 6/1995 |
| WO | WO 2006/068216 | 6/2006 |
| WO | 2007/029788 A1 | 3/2007 |

* cited by examiner

OPTICAL FILM AND METHOD OF ADJUSTING WAVELENGTH DISPERSION CHARACTERISTICS OF THE SAME

This application claims the benefit of PCT/KR2008/004715 filed on Aug. 13, 2008, and Korean Patent Application No. 10-2007-0081943 filed on Aug. 14,2007 and Korean Patent Application No. 10-2008-0079275 filed on Aug. 13, 2008. all of which are hereby incorporated herein by reference for all purposes in their entirety.

TECHNICAL FIELD

The present invention relates to an optical film used in liquid crystal displays (LCD) or organic light-emitting diodes (OLED), etc, and more particularly, to an optical film whose wavelength dispersion characteristics and polarization direction are adjusted, and a method of adjusting wavelength dispersion characteristics of the same.

BACKGROUND ART

Liquid crystal that is present in liquid crystal cells used in display devices such as LCD has a birefringence property. This birefringence property causes the difference in reflective index of light according to the positions in which a user views the liquid crystal display device, and also causes the difference in degree of polarization when linearly polarized light is passed through the liquid crystal molecules. As a result, the light transmittance and color characteristics observed when a display device is viewed from positions other than the front of the display device are different from those when the liquid crystal display device is viewed from its front. Therefore, this is problematic because it is difficult to realize a high-quality image: on the liquid crystal display device.

Therefore, optical films (for example, retardation films) are used in LCD to compensate for the retardance in the liquid crystal cells. In this case, these films function to improve properties such as a viewing angle, a contrast ratio and color characteristics by reversely compensating for a change in retardance of light, wherein the change in retardance of light is generated when the light is passed through the liquid crystal cell. For this purpose, the optical films should be designed to optimize optical characteristics.

One of the inherent optical characteristics of the optical films is wavelength dispersion characteristic. The expression "wavelength dispersion characteristic" means the changes in retardance according to the wavelengths of light when light is incident on an optical film at a given incidence angle and a reference wavelength. In general, the wavelength dispersion characteristics of the retardation, films are divided into a normal dispersion, a flat dispersion and an inverse dispersion, depending on the shapes of the dispersions, as shown in FIG. 1.

The retardance value is represented by $R(\lambda)=\Delta n(\lambda) \times d$, wherein $\Delta n$ represents birefringence, and d represents thickness of a film. From the equation, it might be seen that the retardance value is varied according to the birefringence $\Delta n$ and the birefringence $\Delta n$ is a function of the wavelength ($\lambda$). As a result, the optical films have wavelength dispersion characteristics that the retardance value of the retardation film is varied according to the wavelength. Therefore, it is possible to control the wavelength dispersion characteristics of the optical films under the control of birefringence.

U.S. Pat. No. 6,800,697 discloses a method for controlling the wavelength dispersion of a retardation film by adjusting a mixing ratio of at least two kinds of copolymers to control the birefringence of materials from which the retardation film is produced.

However, materials that may be used in the manufacture of the retardation film are strictly restrictive. Moreover, most of the materials have problems in that phase separation may take place when they are mixed with other materials since they have low compatibility to the other materials. Therefore, the method of controlling the wavelength dispersion characteristics using the materials as disclosed in the U.S. patent has its limits in that the method is performed within a highly restrictive extent.

As an alternative to control wavelength dispersion characteristics of a retardation film, Japanese Patent No. 2609139 discloses a method for controlling wavelength dispersion characteristics of a retardation film by attaching a plurality of retardation films at a constant angle, the retardation films having different retardance. However, the method also has problems in that it is difficult to attach a plurality of the retardation films to each other at a constant angle, and the transmittance is deteriorated due to the increased thickness of the retardation films.

DISCLOSURE OF INVENTION

Technical Problem

The present invention is designed to solve the problems of the prior art, and therefore it is an object of the present invention to provide a method of adjusting wavelength dispersion characteristics of an optical film having excellent productivity without any limitation on the use of materials.

Also, it is another object of the present invention to provide an optical film manufactured by the method according to one exemplary embodiment of the present invention.

Technical Solution

According to an aspect of the present invention, there is provided an optical film including at least one retardation film and at least one isotropic layer made of an isotropic material, wherein the difference in average refractive index between the retardation film and the isotropic layer is at least 0.1 or more.

In this case, the retardation film may be made of triacetic cellulose (TAC) film, a cyclo olefin polymer (COP) film, or the like, having a birefringence property, regardless of the film. For example, the retardation film may be divided into an A film, a B film and a C film according, to the optical characteristics of the film, and they may be used herein.

Meanwhile, the isotropic layer may be made of an isotropic material wherein the difference in average refractive index between the retardation film and the isotropic material is at least 0.1 or more, and the isotropic layer may preferably have a thickness of 1 to 500 nm. Examples of the isotropic material includes, but are particularly limited to, isotropic materials, such as ITO, ZnS or $TiO_2$, having a higher refractive index (high refractive index) than the average refractive index of the retardation film, and isotropic materials, such as silicone-modified fluoropolymer, silicone or porous silica nano-molecules, having a lower refractive index (low refractive index) than the average refractive index of the retardation film. In addition to the materials as listed above, materials having a refractive index from which the difference in average refractive index of the retardation film is at least 0.1 or more and having isotropic property may be used without any limitation on the use of the materials.

According to another aspect of the present invention, there is provided a method for adjusting wavelength dispersion characteristics of an optical film. The method of the present invention includes: stacking an isotropic layer onto the retardation film. In this case, the stacking of the isotropic layer may be performed using a sputtering, coating or chemical vapor deposition method, etc.

Advantageous Effects

As described above, the present invention provides a method for adjusting wavelength dispersion characteristics of an optical film and an optical film manufactured by using the method. Optical films having a variety of wavelength dispersion characteristics may be manufactured by the method according to one exemplary embodiment of the present invention. Therefore, one exemplary embodiment of the present invention may be useful to provide an optical film having wavelength dispersion characteristics that are optimized according to the kinds, for example an LCD-cell driving mode, of display devices. Therefore, it is possible to realize a display device having excellent optical performances such as color locus and contrast ratio.

Furthermore, the method of adjusting wavelength dispersion characteristics of an optical film according to one exemplary embodiment of the present invention has advantages in that the manufacturing processes are simple and the productivity is excellent.

BRIEF DESCRIPTION OF THE DRAWINGS

In FIG. 2 a reference numeral 1 represents a retardation film, and a reference numeral 2 represents an isotropic layer.

BEST MODE FOR CARRYING OUT THE INVENTION

Hereinafter, the present invention will be described in more detail with reference to the accompanying drawings.

The optical film according to one exemplary embodiment of the present invention includes at least one retardation film; and at least one isotropic layer made of an isotropic material that is coated or stacked onto the retardation film, wherein the difference in average refractive index between the retardation film and the isotropic layer is at least 0.1 or more, and preferably is in a range from 0.1 to 1.0.

The optical film according to one exemplary embodiment of the present invention as configured thus has different wavelength dispersion characteristics from the original retardation films since the polarization rotation and thin film interference occur when light is passed through the isotropic layer.

A principle of adjusting the wavelength dispersion characteristics of the optical film according to the present invention will be described in more detail with reference to the accompanying drawings.

Figure 1:
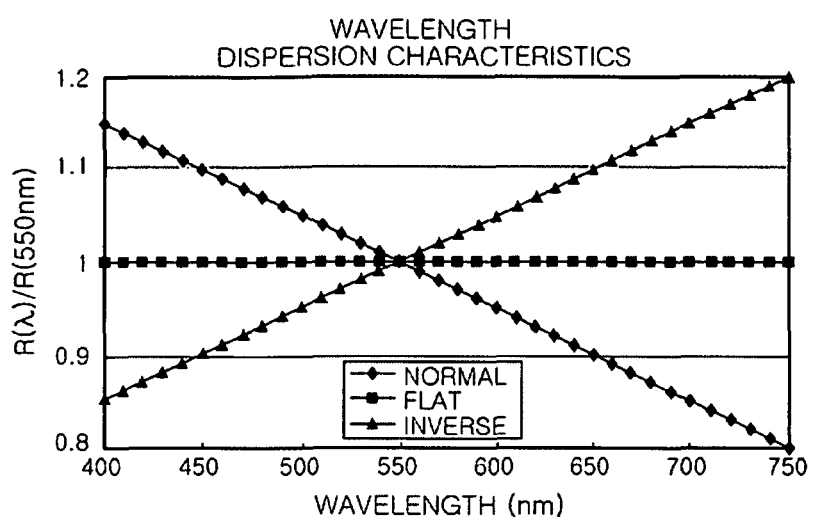
FIG. 1 is a graph illustrating wavelength dispersion characteristics of an optical film.
Figure 2:
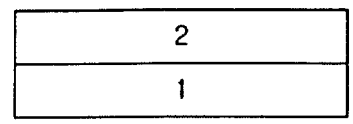
FIG. 2 is a cross-sectional view illustrating an optical film according to the present invention.
Figure 3:
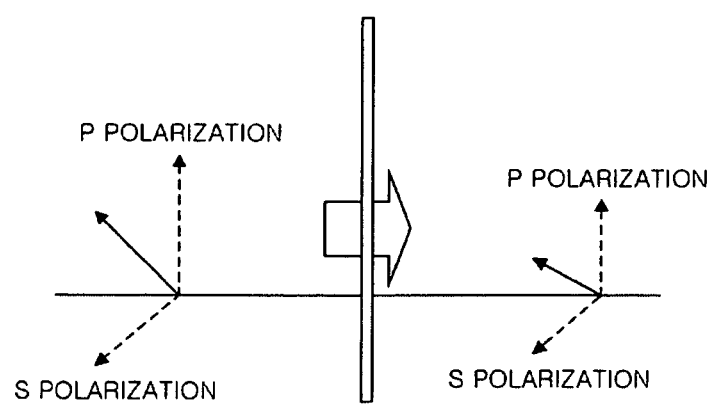
FIG. 3 is a diagram illustrating a polarization rotation.

FIG. 3 is a diagram illustrating a polarization rotation.

The light that is incident aslant with an incidence angle to a plane formed by two materials having different refractive indexes is refracted as mach as the respective differences in refractive index, and some of the incident light is reflected in the same angle as the incidence angle. In this case, the incident light may have any polarization state. In particular, the polarization of light that vibrates in a fast axis to the incidence plane is called s-polarization, and the polarization of light that that vibrates in a horizontal direction to the incidence plane is called p-polarization.

When light is passed through the two materials having different refractive indexes, p-polarization and s-polarization show the differences in reflectance and transmittance. In general, the reflectance (r) and the transmittance (t) according to the s-polarization and the p-polarization may be represented by the following Fresnel equation.

$$r_s = (n_i \cos \theta_i - n_f \cos \theta_f)/(n_i \cos \theta_i + n_f \cos \theta_f)$$

$$r_p = (n_f \cos \theta_i - n_i \cos \theta_f)/(n_f \cos \theta_i + n_i \cos \theta_f)$$

$$t_s = (2n_i \cos \theta_i)/(n_i \cos \theta_i + n_f \cos \theta_f)$$

$$t_p = (2n_i \cos \theta_i)/(n_f \cos \theta_i + n_i \cos \theta_f)$$

wherein, r represents a reflectance, t represents a transmittance, n represents a refractive index in a light-incident material, $\theta_i$ represents an incidence angle in the light-incident material, $n_f$ represents a refractive index in a light-transmitted material, and $\theta_f$ represents an incidence angle in the light-transmitted material.

As seen from the Fresnel equation, since the transmittance and reflectance of each of the p-polarization and s-polarization is a function of a refractive index of a material and an incidence angle of light, the transmittance and reflectance of the p-polarization and the s-polarization are varied when the refractive index of the material or the incidence angle of light is varied, which leads to the polarization rotation in which a polarization state of light is changed. For example, the p-polarization and the s-polarization are different in transmittance when a 45° linearly polarized light with p-polarization and s-polarization that are identical in size is passed through a material layer having different refractive indexes as shown in FIG. 3, the transmitted light is changed into a linearly polarized light that are different from the original 45° linearly polarized light.

Figure 4:
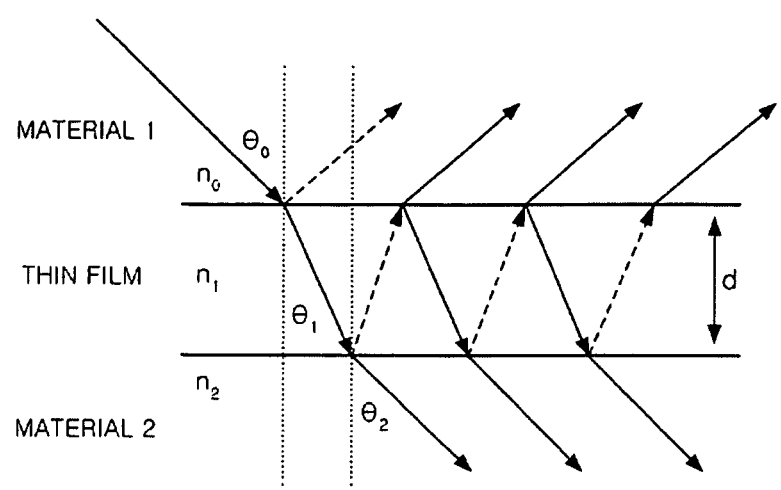
FIG. 4 is a diagram illustrating paths of light in a thin film that is adjacent to the materials having different refractive indexes.

Meanwhile, FIG. 4 is a diagram illustrating interference of light. Here, FIG. 4 shows paths of light in a thin film that is adjacent to the materials having differences in refractive index. As shown in FIG. 4, the light entering the thin film is repeatedly transmitted to or reflected from an interface of the two materials, and the finally observed light is identical to the sum of the transmitted light and the reflected light. This is referred to as 'thin film interference.' In general, the thin film interference causes the changes in phase.

The present inventors have ardent attempts in consideration of the above facts, and found that, when a layer of isotropic materials having different refractive indexes is formed on a retardation film, the change in retardance occurs by the thin film interference and the polarization rotation occurs by the differences in transmittance and reflectance of the p-polarization and the s-polarization, which indicates that the wavelength dispersion characteristics of the retardation film may be effectively changed. Therefore, the present invention has been completed on the basis of the above facts. Also, the present inventors have found that the wavelength dispersion characteristics of an optical film may be varied according to the thickness of an isotropic layer, the kinds of isotropic materials, and the kinds of retardation films.

According to the present invention, optical films having a variety of wavelength dispersion characteristics may be manufactured only when an isotropic layer is formed on the conventional retardation films. One exemplary embodiment of the present invention is advantageous because the prodictivity may be considerably improved due to the simple manufacturing processes and the small limitation on the use of materials, compared to the conventional methods.

Meanwhile, the present inventors have found that the difference in average refractive indexes between the isotropic layer and the retardation film should be at least 0.1 or more, preferably be in a range from approximately 0.1 to 1.0, and more preferably in a range from approximately 0.1 to 0.5 in, order to achieve the significant change in wavelength dispersion characteristics. The thin film interference more strongly appears as the difference in refractive indexes between a thin film material and its adjacent materials increases, which leads to an increase in the size of retardance mused by the thin film interference.

The present inventors have found, on the basis of the experiments, that the commercially available change in wavelength dispersion characteristics may be achieved when the retardance should be changed by 1 nm or more, and preferably approximately 3 nm or more when compared to the conventional retarclance as measured at wavelengths of 500, 550 and 600 nm. As a result, they have found that the retardance is different but the difference in refractive index between the isotropic layer and the retardation film should be at least 0.1 or more, preferably is in a range from approximately 0.1 to 1.0, and more preferably in a range from approximately 0.1 to 0.5, depending on the thickness of an isotropic layer. A retardance value was measured using an Axoscan retardance measurement apparatus.

Also, the present inventors have found that the isotropic layer preferably has a thickness of approximately 1 to 500 nm, and more preferably approximately 10 to 300 nm so as to achieve the significant change in wavelength dispersion characteristics.

When the thickness of the isotropic layer is less than 1 nm, there is difficulty in the manufacturing process, whereas when the thickness of the isotropic layer exceeds 500 nm, the front transmittance of the optical films is deteriorated, which adversely affect its optical properties. In general, the changes in phase by the thin film interference is not significant when the thickness of a thin film is generally higher than wavelengths of light, but the changes in phase is increased when the thickness of a thin film is smaller than wavelengths of light. Therefore, the thickness of the isotropic layer is preferably smaller than the wavelengths of light in order to achieve the significant change in wavelength dispersion characteristics. Considering that a wavelength range of a visible ray is in a range of 400 to 800 nm, the thickness of the isotropic layer according to one exemplary embodiment of the present invention is preferably within the above-mentioned thickness range.

Meanwhile, the expression "retardation film" used herein includes a film, a layer and a plate, all of which have uni-axial or bi-axial birefringence. Here, a uni-axial retardation film refers to a film whose refractive index is identical in two of three directions (x, y and z) and is different in one of three directions (x, y and z), and the bi-axial retardation film refers to a film whose refractive index is different in all three directions (x, y and z). In the present invention, all anisotropic films, such as a ±A-film, a ±B-film or a ±C-film, having retardance may be used as the retardation film.

Here, the A-film refers to a film having birefringence in plane, and the retardance value in plane, $R_{in}$, is defined, as follows.

$$R_{in} = d \times (n_e - n_o)$$

wherein, $n_e$ represents one of three refractive indexes, $n_o$ represents two identical refractive indexes, and d represents a thickness of a film. Also, the +A film satisfies nx >ny=nz and the −A film satisfies nx<ny=nz.

Film A is generally manufactured by elongating a polymeric film in a uni-axial direction, or arranging rod-type or discotic liquid crystal in a horizontal direction.

Film C is a film having different refractive indexes in a thickness direction (z axis), and the retardance in thickness direction, $R_{th}$, is defined, as follows.

$$R_{in} = d \times (N_z - n_y)$$

wherein, $n_z$ represents a refractive index in a thickness direction, $n_y$ represents a refractive index in an in-plane direction, and d represents a thickness. Also, the +C film satisfies $n_x = n_y < n_z$, and the −C film satisfies $n_x = n_y > n_z$.

Film C is generally manufactured by elongating a polymeric film in a uni-axial direction, or by arranging a rod-type or discotic liquid crystal in a fast axis.

Film B is a film having different refractive indexes in all three directions, and the retardance value in plane, $R_{in}$, and and the retardance value in thickness direction, $R_{th}$, are defined, as follows.

$$R_{in} = d \times (n_x - n_y)$$

$$R_{th} = d \times (n_z - n_y)$$

In this case, the film B becomes a +B film'when the film B satisfies nx>ny>nz. and the film B becomes a −B film when the film B satisfies nx>nz>ny. Here, the B film is manufactured by elongating a polymeric film in a bi-axial direction. In this case, tri-acetylcellulose (TAC), cyclic olefin polymer (COP) or the like may be used as the polymeric film.

Meanwhile, the isotropic material means a material having substantially same refractive indexes in all directions, i.e. an x axis, a y axis, a z axis (nx=ny=nz), and most of the materials generally belong to isotropic materials, and have their inherent refractive indexes.

In the present invention, the isotropic material is characterized in that it has a refractive index from which the difference in average refractive index of the retardation film is at least 0.1 or more. That is, when a retardation film has an average refractive index of 1.5, isotropic materials having a refractive index of 1.4 or less or 1.6 or more may be used as the retardation film. In this case, the average refractive index of the retardation film means $(n_x+n_y+n_z)/3$.

Meanwhile, the isotropic material used in the present invention includes, but is not particularly limited to, isotropic materials, such as ITO, ZnS and $TiO_2$, having a higher refractive index (high refractive index) than the average refractive index of the retardation film, and isotropic: materials, such as silicone-modified fluoropolymer, silicone and porous silica nano-molecules, having a lower refractive index (low refractive index) than the average refractive index of the retardation film, and they may be used alone or in combinations thereof.

Examples of the silicone-modified fluoropolymer are disclosed in US Patent Publication No. 2006-0148824, and a silicone (i.e. LSS-2233-10-PST (Polymer systems Technology Limited)) having a refractive index of approximately 1.28 to 1.33 may be used as the silicone. Also, a product having a refractive index of approximately 1.25 to 1.3 (commercially available from Merck) may be used as the porous silica nano-molecules.

In addition to the above-mentioned isotropic materials, any of materials having a refractive index so that the difference in average refractive index between the retardation film and the isotropic layer can be 0.1 or more and having isotropic property may be used as the materials constituting the isotropic layer.

Meanwhile, each of the retardation film and the isotropic layer may be stacked in plural number.

Next, the method for adjusting wavelength dispersion characteristics of an optical film according to one exemplary embodiment of the present invention will be described in more detail.

The method for adjusting wavelength dispersion characteristics of an optical film according to one exemplary embodiment of the present invention is carried out by forming an isotropic layer onto a retardation film, wherein the isotropic material has a refractive index so that the difference in average refractive index between the retardation film and the isotropic layer is 0.1 or more, and the retardation film has its own inherent wavelength dispersion characteristics.

In this case, a film, a layer and a plate, all of which have uni-axial or bi-axial birefringence, may be used as the retardation film, and examples of the retardation film include, for example, a ±A-film, a ±B-film or a ±C-film.

Also, the isotropic layer includes isotropic materials, such as ITO, ZnS and $TiO_2$, having a higher refractive index (high refractive index) than the average refractive index of the retardation film, and isotropic materials, stet as silicone-modified fluoropolymer, silicone and porous silica nano-molecules, having a lower refractive index (low refractive index) than the average refractive index of the retardation film.

Meanwhile, the stacking process may be carried out using a sputtering, coating or chemical vapor deposition method. In this case, the stacking process should be performed without degrading the optical characteristics (transmittance, etc.) of the retardation film, and therefore it is preferred to select and use a suitable method according to the kinds of the stacked isotropic materials. For example, the sputtering method is preferably used when ITO is stacked onto the retardation film, and the coating method is preferably used when titanium dioxide ($TiO_2$) is stacked onto the retardation film.

As described above, when an isotropic layer having a refractive index difference of 0.1 or more is formed on a retardation film, the changes in phase occur by the polarization rotation and the thin film interference that are caused by the difference in transmittance and reflectance of the p-polarization and the s-polarization in an interface of the retardation film and the isotropic material, and therefore the wavelength dispersion characteristics of the optical films are different from those of the original retardation film.

In this case, the changes in wavelength dispersion characteristics are varied according to the thickness of an isotropic layer, and the difference in refractive indexes between the isotropic layer and the retardation film. It is considered that an optical film having desired wavelength dispersion characteristics may be manufactured through the context and suitable experiments disclosed in this specification, for example, by coating a retardation film with isotropic layers having different thicknesses and determining wavelength dispersion characteristics of the retardation film, as evident to those skilled in the art.

The method according to one exemplary embodiment of the present invention as configured thus may be used to manufacture an optical film having optimized wavelength dispersion characteristics, depending on the desired purposes and uses, for example, modes (IPS, TN and the like) of LCD devices. In this case, when the optical film having optimized wavelength dispersion characteristics is installed in a display device, it is possible to manufacture the display device having excellent color locus and contrast ratio when compared to the conventional display devices.

Mode for the Invention

Hereinafter, exemplary embodiments of the present invention will be described in more detail with reference to the accompanying drawings.

EXAMPLES

Example 1

Four negative uni-axial TAC films (−C films, commercially available from Fuji) having a refractive index of 1.48 and a thickness of 80 μm were coated respectively with $TiO_2$ having a refractive index of approximately 1.68 to thicknesses of 36 nm, 60 nm, 88 nm and 116 nm, and then cared to form isotropic layers, thus to prepare optic-al films.

In this case, an optical film in which a 36 nm-thick isotropic layer is formed is referred to as $A_1$, an optical film in which a 60 nm-thick isotropic layer is formed is referred to as $B_1$, an optical film in which an 88 nm-thick isotropic layer is formed is referred to as $C_1$, and an optical film in which a 116 nm-thick isotropic layer is formed is referred to as $D_1$.

Figure 5:
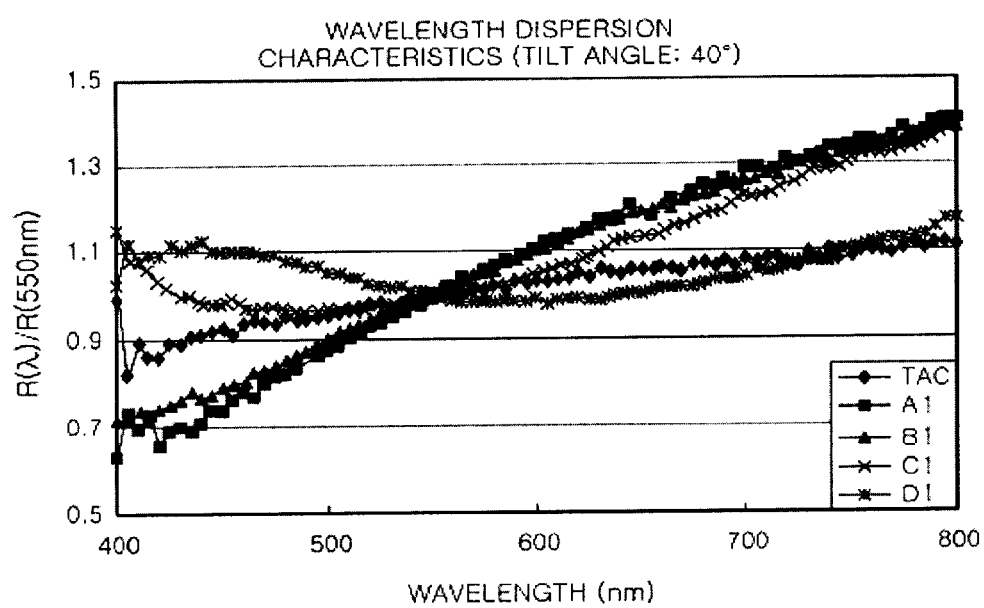
FIG. 5 is a graph illustrating wavelength dispersion characteristics of the optical film as described in Example 1.

Wavelength dispersion characteristics $R(\lambda)/R$ (550 nm) of the optical films $A_1$, $B_1$, $C_1$ and $D_1$ were measured under conditions of a reference wavelength of 550 nm and a tilt angle of 40°. The wavelength dispersion characteristics were measured using a retardance measurement apparatus (Axoscan, Axometrics Co. Ltd.). In this case, the measured wavelength range is determined to be in a range from 400 to 800 nm, and the measured retardance values according to the wavelength are divided by the retardance value at 550 nm, and the resulting value is then expressed as the dispersion characteristics. The measured results are shown in FIG. 5.

Example 2

Four positive uni-axial COP films (+A films, commercially available from Zeon) having a refractive index of 1.53 and a thickness of 80 μm were coated respectively with $TiO_2$ having a refractive index of approximately 1.68 to thicknesses of 38 nm, 61 nm, 90 nm and 115 nm, and then aired to form isotropic layers, thus to prepare optical films.

In this case, an optical film in which a 38 nm-thick isotropic layer is formed is referred to as $A_2$, an optical film in which a 61 nm-thick isotropic layer is formed is referred to as $B_2$, an optical film in which a 90 nm-thick isotropic layer is formed is referred to as $C_2$, and an optical film in which a 1.15 nm-thick isotropic layer is formed is referred to as $D_2$.

Figure 6:
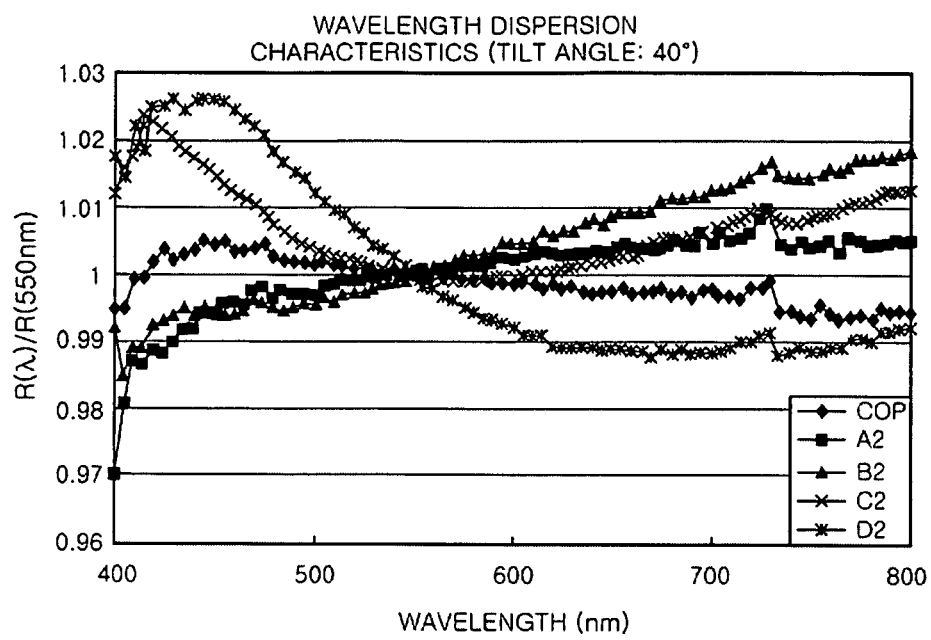
FIG. 6 is a graph illustrating wavelength dispersion characteristics of the optical film as described in Example 2.

Wavelength dispersion characteristics $R(\lambda)/R$ (550 nm) of the optical films $A_2$, $B_2$, $C_2$ and $D_2$ were measured under conditions of a reference wavelength of 550 nm and a tilt angle of 40° in the same manner as in Example 1. The measured results are shown in FIG. 6.

Example 3

Three positive uni-axial COP films (+A films, commercially available from Zeon) having a refractive index of 1.53 and a thickness of 80 μm were sputtered respectively with ITO having a refractive index of approximately 2.00 to form isotropic layers having thicknesses of 80 nm, 120 nm and 160 nm, respectively, thus to prepare optical films.

In this case, an optical film in which an 80 nm-thick isotropic layer is formed is referred to as $A_3$, an optical film in which a 120 nm-thick isotropic layer is formed is referred to as $B_3$, and an optical film in which a 160 nm-thick isotropic layer is formed is referred to as $C_3$.

Figure 7:
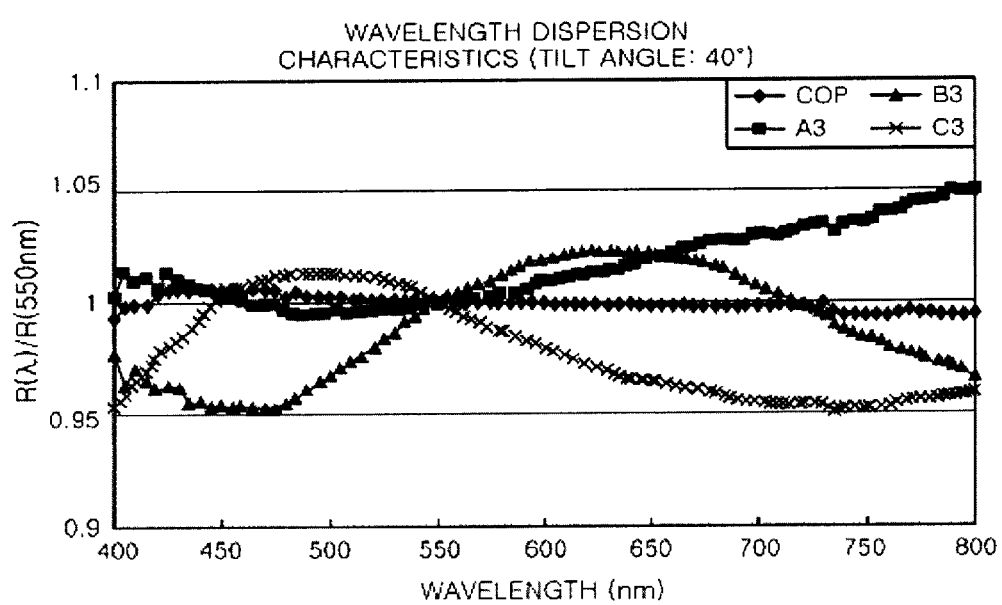
FIG. 7 is a graph illustrating wavelength dispersion characteristics of the optical film as described in Example 3.

Wavelength dispersion characteristics $R(\lambda)/R(550 nm)$ of the optical films $A_3$, $B_3$ and $C_3$ were measured under conditions of a reference wavelength of 550 nm and a tilt angle of 40° in the same manner as in Example 1. The measured results are shown in FIG. 7.

Example 4

One negative bi-axial TAC film (a −B film, commercially available from Konica) having a refractive index of 1.48, a thickness of 80 μm and $R_{in}$=40 nm and $R_{th}$=140 nm was sputtered with ITO having a refractive index of approximately 2.00 to form isotropic layers having thickness of 120 nm, thus to prepare an optical film ($A_4$).

Figure 8:
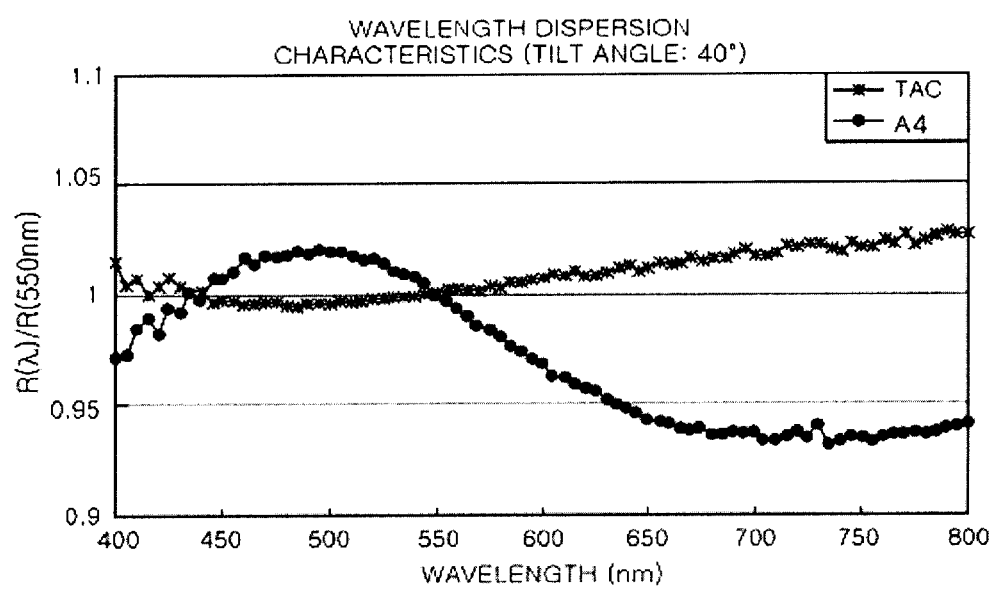
FIG. 8 is a graph illustrating wavelength dispersion characteristics of the optical film as described in Example 4.

Wavelength dispersion characteristics $R(\lambda)/R$ (550 nm) of the $A_4$ were measured under conditions of a reference wavelength of 550 nm and a tilt angle of 40° in the same manner as in Example 1. The measured results are shown in FIG. 8.

Example 5

Three positive bi-axial COP films (+B films, commercially available from Zeon) having, a refractive index of 1.53, a thickness of 80 μm and $R_{in}$=60 nm and $R_{th}$=170 nm were coated respectively with $TiO_2$ having a refractive index of approximately 1.68, and then cured. Then, isotropic layers having thicknesses of 40 nm, 86 nm and 144 nm were formed respectively on the positive bi-axial COP films to prepare optical films.

In this case, an optical film in which a 40 nm-thick isotropic layer is formed is referred to as $A_5$, an optical film in which an 86 nm-thick isotropic layer is formed is referred to as $B_5$, and an optical film in which a 144 nm-thick isotropic layer is formed is referred to as $C_5$.

Figure 9:
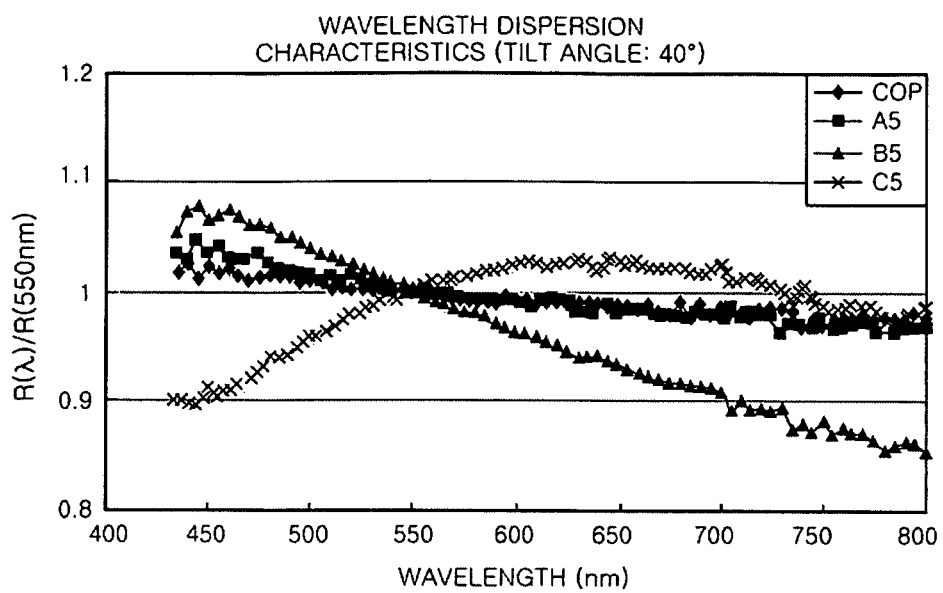
FIG. 9 is a graph illustrating wavelength dispersion characteristics of the optical film as described in Example 5.

Wavelength dispersion characteristics $R(\lambda)/R$ (550 nm) of the optical films $A_5$, $B_5$ and $C_5$ were measured under conditions of a reference wavelength of 550 nm and a tilt angle of 40° in the same manner as in Example 1. The measured results are shown in FIG. 9.

As shown in FIGS. 5 to 9, it is revealed that the optical films according to the present invention shows a variety of wavelength dispersion characteristics, depending on the kinds of the retardation film, the thickness of the isotropic materials, and the thickness of films.

Example 6

Three TAC films (−B films, commercially available from Fuji) having a refractive index of 1.48 and a thickness of 80 μm were coated respectively with $TiO_2$ having a refractive index of approximately 1.82 to, thicknesses of 20 nm, 70 nm and 130 nm, and then cured to form isotropic layers, thus to prepare optical films.

Then, an isotropic layer was formed on each of the TAC films to prepare optical films.

In this case, an optical film in which a 20 nm-thick isotropic layer is formed is referred to as $A_6$, an optical film in which a 70 nm-thick isotropic layer is formed is referred to as $B_6$, and an optical film in which a 130 nm-thick isotropic layer is formed is referred to as $C_6$.

Comparative Example 1

For the comparison purpose, three TAC films (−B films, commercially available from Fuji) having the same refractive index and thickness were coated respectively with an acrylate resin having a refractive index of approximately 1.52 to thicknesses of 20 nm, 70 nm and 130 nm, and then cured. Then, an isotropic layer was formed on each of the TAC films to prepare optical films.

in this case, an optical film in which a 20 nm-thick isotropic layer is formed is referred to as $A_7$, an optical film in which a 70 nm-thick isotropic layer is formed is referred to as $B_7$, and an optical film in which a 130 nm-thick isotropic layer is formed is referred to as $C_7$.

Experimental Example 1

Measurement of Retardance in Slow Axis

Figure 10:
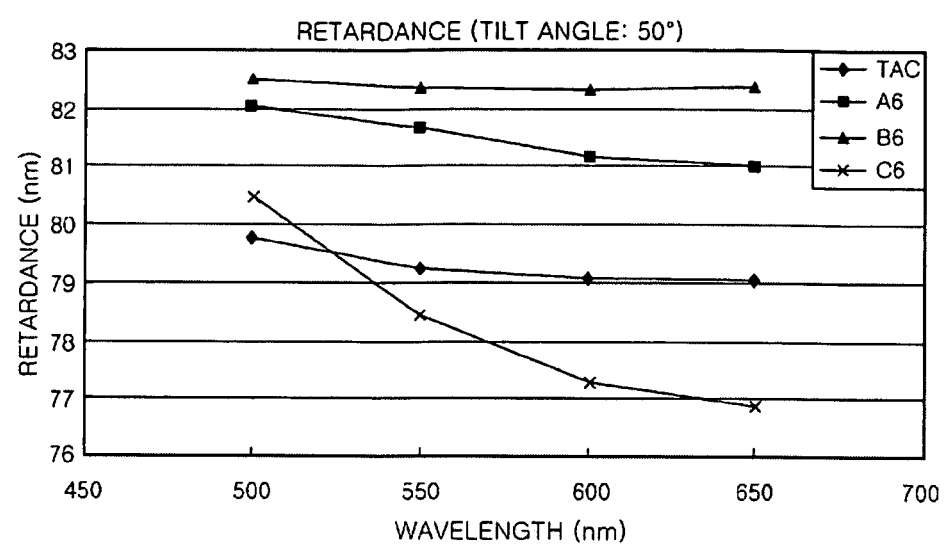
FIG. 10 is a graph illustrating retardance in a slow axis as described in Example 6.

Each of the optical films of Example 6 and Comparative example 1 were measured for retardance in a slow axis. The retardance of the optical films was measured under conditions of a reference wavelength of 550 nm and a tilt angle of 50°. The wavelength dispersion characteristics were measured using a retardance measurement apparatus (Axoscan, Axometrics Co. Ltd:), and a measured wavelength range was 500 to 650 nm. The measured results are shown in FIG. 10 (Example 6) and FIG. 11 (Comparative example 1).

Figure 11:
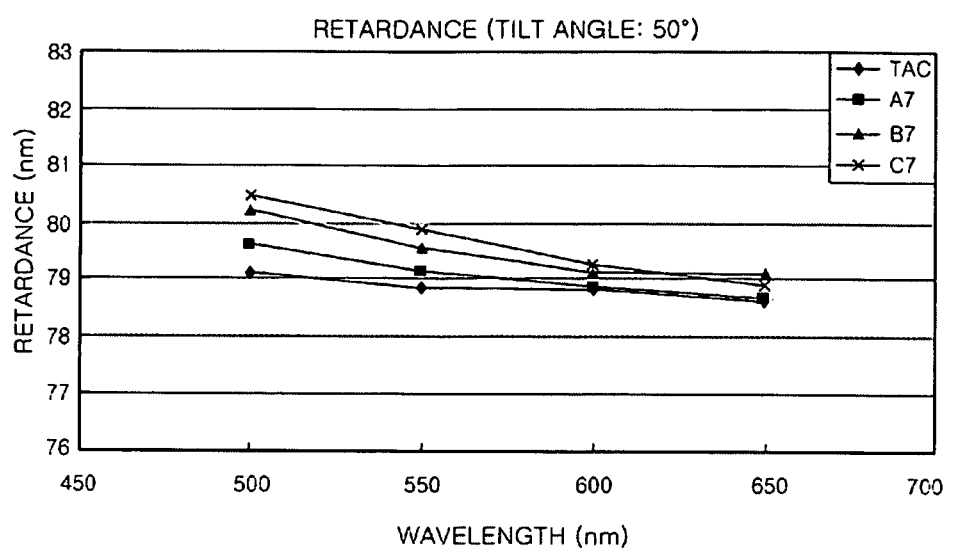
FIG. 11 is a graph illustrating retardance in a slow axis as described in Comparative example 1.

As shown in FIG. 11, it was revealed that the retardance value is not nearly changed in the case of the optical film of Comparative example 1 in which the difference in refractive indexes between the retardation film and the isotropic layer is less than 0.1, resulting in little change in the wavelength dispersion characteristics. On the contrary, it was seen that the retardance is changed by several nanometers or more (approximately 15 nm or more as expressed by $R_{th}$) in the case of the optical film of Example 6, as shown in FIG. 10, resulting in the changes in wavelength dispersion characteristics.

Experimental Example 2

Measurement of Retardance in Fast Axis

Each of the optical films of Example 6 and Comparative example 1 were measured for retardance in a fast axis. The retardance of the optical films was measured under conditions of a reference wavelength of 550 nm and a tilt angle of 50°. The wavelength dispersion characteristics were measured using a retardance measurement apparatus (Axoscan, Axometrics Co. Ltd.), and a measured wavelength range was 500 to 650 nm. The measured results are shown in FIG. 12 (Example 6) and FIG. 13 (Comparative example 1).

Figure 12:
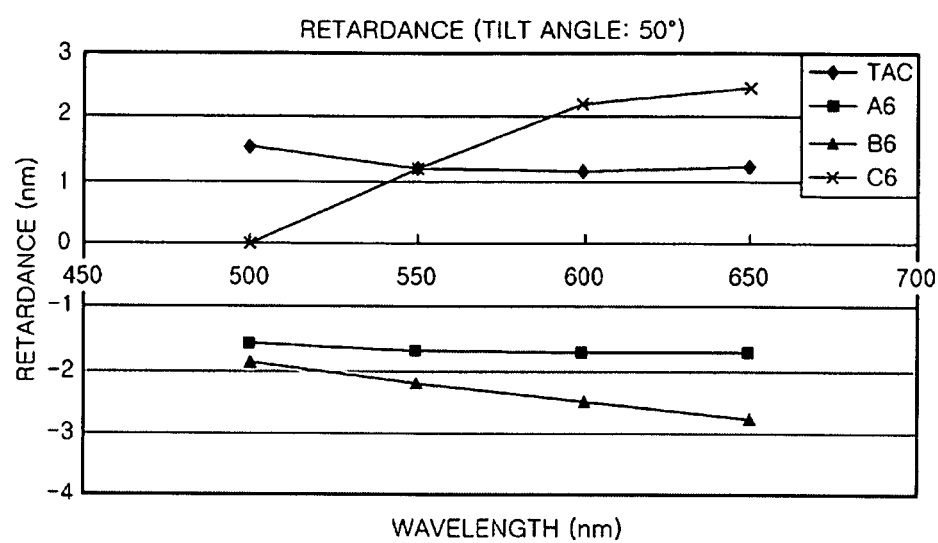
FIG. 12 is a graph illustrating retardance in a fast axis as described in Example 6.
Figure 13:
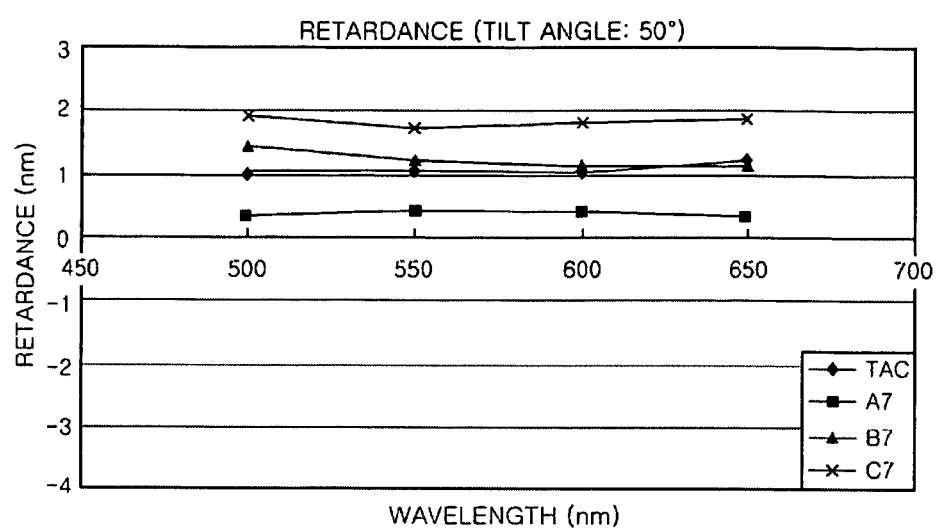
FIG. 13 is a graph illustrating retardance in a fast axis as described in Comparative example 1.

As shown in FIGS. 12 and 13, it was revealed that the wavelength dispersion characteristics of the optical film of Comparative example 1 are not nearly changed, but the wavelength dispersion characteristics of the optical film of Example 6 are significantly changed.

Experimental Example 3

Color Compensation Effect

One TAC film (−B film, commercially available from Fuji) having a refractive index of 1.48 and a thickness of 80 μm was coated with a TiO$_2$-based reactive solution having a refractive index of approximately 1.83 to a thickness of 50 nm to prepare an optical film.

The optical film as prepared thus was installed in a direct-type backlight unit (CMO), and a color locus of the optical film, was measured. The measurement of the color locus was performed, using an Eldim measurement apparatus, by measuring a black color and measuring a color bars of the optical film at a tilt angle of 50° in all directions. The measured results are shown in FIG. 14.

For the comparison purpose, the −B film (commercially available from Fuji) as described right above was installed in a backlight unit, and a color locus of the optical film was measured as the same manner as described right above. The measured results are shown in FIG. 15.

Figure 14:
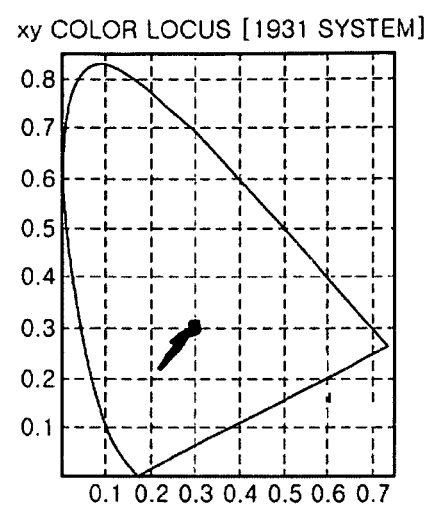
FIG. 14 is a graph illustrating a color compensation effect in installing the optical film according to one exemplary embodiment of the present invention.
Figure 15:
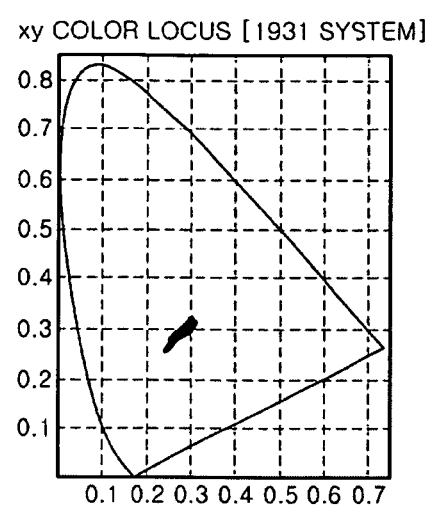
FIG. 15 is a graph illustrating a color compensation effect in installing a conventional optical film.

As shown in FIGS. 14 and 15, it was revealed that, when the optical film prepared by the method according to one exemplary embodiment of the present invention is installed in a backlight unit, the backlight unit has excellent color locus, compared to the conventional backlight unit having only the −B retardation film installed therein.

Experimental Example 4

Luminance Variation

One TAC film (−B film, commercially available from Fuji) having a refractive index of 1.48 and a thickness of 80 μm was coated with a TiO$_2$-based reactive solution having a refractive index of approximately 1.83 to a thickness of 50 nm to prepare an optical film.

The optical film as prepared thus was installed in direct-type backlight unit (CMO), and a black luminance of the optical film was measured.

For the comparison purpose, the −B film (commercially available from Fuji) as described right above was installed in a backlight unit, and a black luminance of the optical film was measured as the same manner as described right above.

Figure 16:
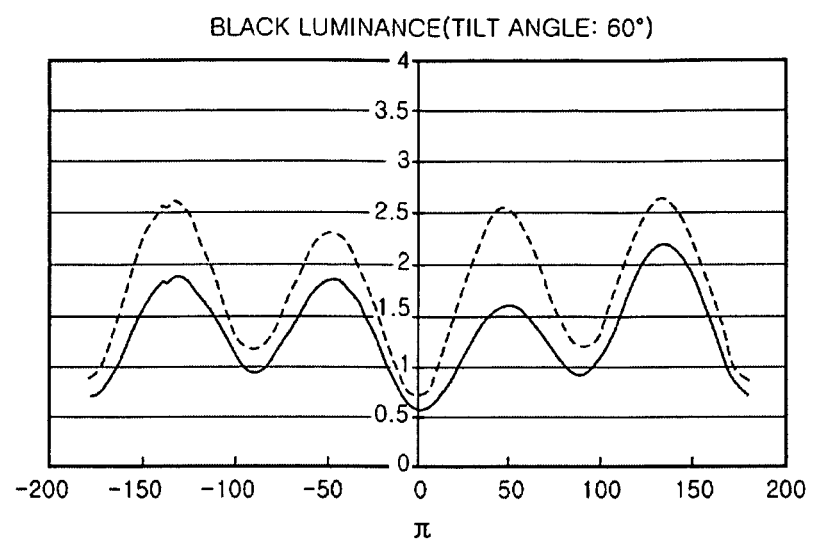
FIG. 16 is a graph illustrating a contrast ratio improvement effect in installing the optical film according to one exemplary embodiment of the present invention.

The measured results are shown in FIG. 16. In this case, a solid line represents a line when the optical film according to one exemplary embodiment of the present invention is installed in a backlight unit, and a dotted lone represents a line when the convention −B retardation film is installed in a backlight unit.

As shown in FIG. 16, it was revealed that the backlight unit has a significantly reduced black luminance when the optical film according to one exemplary embodiment of the present invention is used in the backlight unit, which indicates that the contrast ratio of the optical film is improved.

The invention claimed is:

1. A method of adjusting wavelength dispersion characteristics of an optical film, the method comprising:
    stacking an isotropic layer made of an isotropic material which has a thickness from 1 nm to 500 nm on a retardation film, the isotropic material having a refractive index such that a difference in average refractive indices between the retardation film and the isotropic layer is at least 0.1 or greater,
    wherein the average refractive index of the retardation film is $(n_x+n_y+n_z)/3$,
    wherein the isotropic material is selected from the group consisting of ITO and ZnS, and
    wherein the retardation film is made of triacetylcellulose (TAC) and the retardation film is a −B film.

* * * * *